United States Patent
Koers

(10) Patent No.: US 6,194,198 B1
(45) Date of Patent: Feb. 27, 2001

(54) DEVICE FOR PURIFYING GASES, SUCH AS AIR IN PARTICULAR, OR LIQUIDS, SUCH AS WATER IN PARTICULAR, AND METHOD FOR USE WITH THE DEVICE

(76) Inventor: Bonno Koers, De Bogaard 43, Doesburg (NL)

( * ) Notice: Subject to any disclaimer, the term of this patent is extended or adjusted under 35 U.S.C. 154(b) by 0 days.

(21) Appl. No.: 09/198,511

(22) Filed: Nov. 24, 1998

(51) Int. Cl.$^7$ .................................................. B01D 53/85
(52) U.S. Cl. ...................... 435/266; 435/299.1; 210/615; 210/150
(58) Field of Search ................................. 435/299.1, 266; 210/615, 150, 321.74, 321.83, 497.1, 497.2; 55/498, 500, 484, 485, 520

(56) References Cited

U.S. PATENT DOCUMENTS

| | | | |
|---|---|---|---|
| 3,847,811 | * | 11/1974 | Stengelin et al. ................... 210/150 |
| 4,039,448 | * | 8/1977 | Etani . |
| 4,165,281 | * | 8/1979 | Kuriyama et al. . |
| 4,427,548 | * | 1/1984 | Quick, Jr. . |
| 5,270,207 | * | 12/1993 | Matsumura et al. . |
| 5,445,660 | | 8/1995 | Koers ..................................... 55/222 |
| 5,563,069 | * | 10/1996 | Yang . |

FOREIGN PATENT DOCUMENTS

| | | | |
|---|---|---|---|
| 40 04 030 | * | 8/1991 | (DE) . |
| 0 190 801 | * | 8/1986 | (EP) . |
| 0 669 155 | * | 8/1995 | (EP) . |
| 2 178 447 | * | 2/1987 | (GB) . |
| 2 180 554 | * | 4/1987 | (GB) . |

* cited by examiner

*Primary Examiner*—William H. Beisner
(74) *Attorney, Agent, or Firm*—Foley & Lardner

(57) ABSTRACT

A device for purifying gases, such as air in particular, or liquids, such as water in particular. The device comprises a chamber in which filter material is incorporated. The chamber has inlets and outlets for the medium to be purified. The medium is led through filter material, in which microorganisms are employed for the purification. A mat having large open pores is used as filter material. The mat is manufactured from foamed plastic material having open pores and is flat on one side and is provided with extrusions on the other side. The material may be polyurethane. The mat is wound in such a way that it can be situated on a tube. The chamber has a substantially cylindrical shape into which the rolled-up mat can be fittingly slid.

9 Claims, 1 Drawing Sheet

Figure 1:
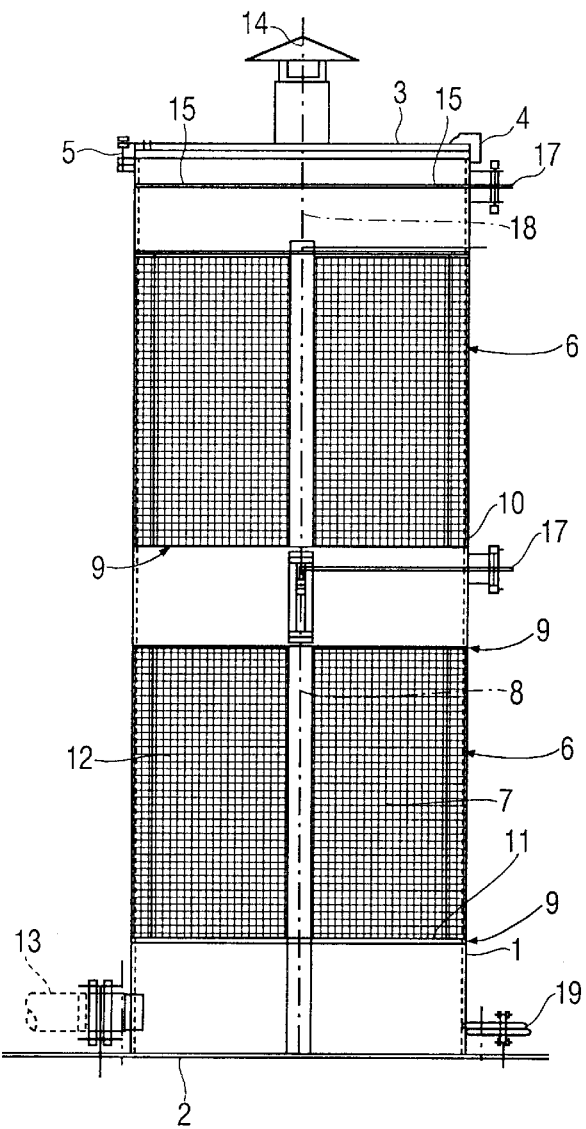

DEVICE FOR PURIFYING GASES, SUCH AS AIR IN PARTICULAR, OR LIQUIDS, SUCH AS WATER IN PARTICULAR, AND METHOD FOR USE WITH THE DEVICE

The invention relates to a device for purifying gases, such as air in particular, or liquids, such as water in particular, said device comprising a chamber in which filter material is incorporated, said chamber having inlets and outlets for the medium to be purified which is to be led through the filter material, in which micro organisms are employed for the purification.

With devices of this type, such as known from U.S. Pat. No. 5,445,660, for example, an organically operating filter material is spread out across a grid floor, which is situated in a rectangular chamber constituted by a number of substantially vertical walls.

Removing the filter material from the space, after the material has lost its activity, is laborious so that the device is relatively expensive in use. In order to prevent the device from being idle too long during replacement of the filter material, a complete chamber is lifted from the feed space for the medium to be purified, and is replaced by another chamber being kept ready.

The object of the invention is to provide a device which is simpler and thus less expensive in use and this is achieved by employing a mat having large open pores, which is manufactured from foamed plastic material, in particular polyurethane, said mat being wound in such a way that it can be situated on a tube, the chamber substantially having a cylindrical shape in which the rolled-up mat can be slid fittingly.

Such a mat is commercially available and is generally flat at one side and provided with protruding portions at the other side so that that surface, seen in cross-section, has a undulating profile. The mat has a very large surface and has very good adhesion properties for micro-organisms.

According to a further elaboration of the invention, the rolled-up mat will have its ends enclosed by a strip of relatively rigid material extending all round, radially extending supporting strips going to the central tube from the former strip, in which the supporting structures located at the end of the mat are directly or indirectly connected.

By providing the chamber with a removable lid, the mat of filter material can be easily pulled up form the cylindrical space and be replaced by a clean one. The used filter mat can be cleaned in another space so that the material can be used anew.

The invention also relates to a filter element which is formed from a rolled-up mat of foamed plastic material, said mat having at least its ends enclosed by a strip of a rigid material, with radially extending supporting strips going to the central tube from the former strip, the two support structures located at the ends of the mat being directly or indirectly connected.

The support strips of the one support structure can be connected to the central tube whereas the ones of the other support structure are connected to a ring that can be slid across the central tube. Both support structures can then be connected by tie rods.

In order to make the mat biologically active, a biomass, such as in the form of a graft will be applied on it when putting it into use. The composition of said graft will depend on she nature and the composition of the medium to be treated. In use, the biomass will expand so that after some time, the optimum yield will have been reached.

The device can be used for purifying air that contains e.g. volatile hydrocarbons. Then, water will be sprayed onto the mat from above, in which said water can be recirculated so that the water consumption is reduced to a minimum. The air will be led through the chamber from the bottom to the top.

Means for keeping or bringing the pH of the recirculated water at the desired value can be present. Additionally, nutrients can be added to the water for an optimal biological purification of the air flowing through the device.

The device can also be provided with measuring equipment for temperature, salt content and pressure drop. Thereby, the most relevant environmental conditions for the micro-organisms can be monitored.

The device can also be applied for the purification of water. The water can flow through the device from the top to the bottom and air can be brought in the bottom part of the chamber so that it flows through the water to be purified from the bottom to the top.

Figure 2:
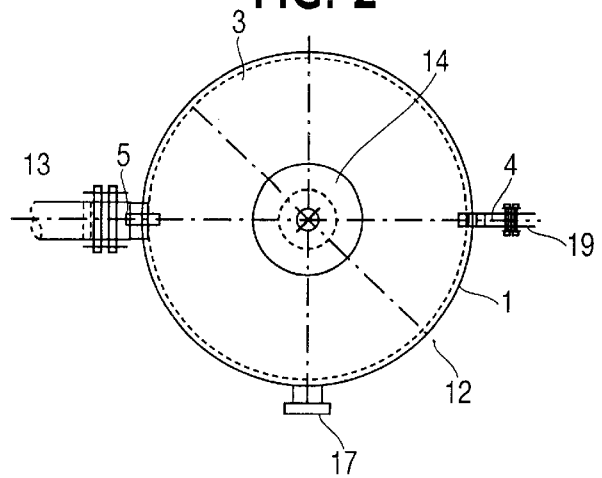

The invention is further explained by way of an embodiment, shown in the drawings, in which;

FIG. 1 shows diagrammatically a vertical cross-section of a device for purifying air; and FIG. 2 shows diagrammatically a plan view of the device of FIG. 1.

The device shown in the drawing comprises the cylindrical chamber 1 which can be manufactured of e.g. fiberglass reinforced plastic. This material can be resistant against aggressive acids and biological activity. The chamber 1 is closed-off at the bottom by a baseplate 2 and at the top side by a lid 3, which is connected to the chamber 1 by means of a pivot 4 and can be pressed against the chamber by a clamp system 5.

Within the chamber 1 there are two filter elements 6 of filter material in the form of mats 7 being rolled-up in such a way that they fit on a tube 8 and can be received externally fitting into the chamber 1. At the top and bottom sides, the mat 7 is supported by a support structure 9 comprising a circumferentially extending strip 10 that has radially extending support rods 11 mounted to it. The support rods of the lower structure 9 can e.g. be directly connected to the tube 8 and those of the upper one to a ring which can be slid onto the tube 8. Both structures can then be pulled towards each other by tie rods 12.

At its bottom, the chamber 1 is provided with an air inlet 13 and the lid 3 is provided with an air outlet 14 for the discharge of purified air. Further, the chamber 1 is provided with hoisting lugs 15.

Above each filter element 6 there is a pipe 17 provided with a nozzle 18 for spraying water onto the mat 6. At the bottom of the chamber 1 the water is discharged by means of the pipe 19. The pipe 17 with the nozzles 18 can be easily removed when the filter elements 6 have to be replaced. To that end, the connection of the tubes 8 of both filter elements 6 is designed in a special way not further indicated.

When the device is to be used for purifying water, the water will be brought onto the upper filter element 6. Then, the water can be supplied to e.g. the lower end of the tube 8, which then will have a sufficiently large diameter. From the upper end of the tube 8, the water is then distributed across the filter element 6 in order to flow downwards. The water can then be discharged from the lower end of the chamber 1. At the lower end of the chamber 1, air can be supplied, in such a way that the air goes up through the water.

It will be obvious that only one possible embodiment of a device according to the invention has been illustrated in the drawing and that only some applications have been described above, and that many modifications can be made without leaving the inventive idea as it is indicated in the claims.

What is claimed is:

1. A device for purifying a gas or liquid medium comprising:
   a substantially cylindrical chamber;
   a tube centrally located along a central axis of the chamber;
   an inlet for leading the medium into the chamber;
   an outlet for leading the medium out of the chamber;
   at least one rolled-up mat situated in the chamber and on the tube so that the medium passes through the at least one mat, the at least one mat comprising a foamed plastic filter material in which microorganisms are employed, the filter material having open pores, the at least one mat fittingly slid in the chamber;
   at least one strip of relatively rigid material extending circumferentially and supporting an end of the at least one rolled-up mat; and
   support rods extending radially to the tube and supporting the at least one strip.

2. The device as claimed in claim 1, further comprising:
   a removable lid at one end of the chamber.

3. The device as claimed in claim 1, wherein the filter material comprises polyurethane.

4. A method for using the device of claim 1 comprising:
   applying a biomass in the form of a graft onto the at least one mat to make the at least one mat biologically active.

5. The method of claim 4, further comprising:
   mounting a water supply pipe with one or more nozzles above the at least one mat.

6. The method of claim 4, further comprising:
   spraying water on the at least one mat; and
   recirculating the water.

7. The method of claim 6, further comprising:
   maintaining a pH of the recirculated water at a desired value.

8. The method of claim 4, further comprising:
   providing water on the at least one mat; and
   adding nutrients to the water.

9. The method of claim 4, further comprising:
   providing water above the at least one mat;
   bringing air into a lower part of the chamber so that it will flow from a lower part to a top of the chamber and through the water to be purified.

* * * * *